Jan. 27, 1970 T. FOSDICK ET AL 3,492,653

STATISTICAL ERROR REDUCTION IN CHARACTER RECOGNITION SYSTEMS

Filed Sept. 8, 1967 3 Sheets-Sheet 1

INVENTORS
THERON FOSDICK
ARTHUR HAMBURGEN
ROBERT B. HENNIS

BY Homer L. Knearl
AGENT

Jan. 27, 1970 T. FOSDICK ET AL 3,492,653

STATISTICAL ERROR REDUCTION IN CHARACTER RECOGNITION SYSTEMS

Filed Sept. 8, 1967 3 Sheets-Sheet 2

STATISTICAL ERROR REDUCTION IN CHARACTER RECOGNITION SYSTEMS

Filed Sept. 8, 1967

3 Sheets-Sheet 3

United States Patent Office 3,492,653

Patented Jan. 27, 1970

3,492,653

STATISTICAL ERROR REDUCTION IN CHARACTER RECOGNITION SYSTEMS

Theron Fosdick, Glyndon, Md., Arthur Hamburgen, Rochester, Minn., and Robert B. Hennis, New Canaan, Conn., assignors to International Business Machines Corporation, Armonk, N.Y., a corporation of New York Filed Sept. 8, 1967, Ser. No. 666,402
Int. Cl. G11b 13/00
U.S. Cl. 340—172.5 8 Claims

ABSTRACT OF THE DISCLOSURE

Errors in a character recognition system are statistically reduced by classifying words by their frequency of occurrence. A generator examines a common name register and a register of likely confusion pairs to form entries in an error name register. A comparator compares each error name with a register of legitimate names to see if such a name exists; if so, a calculator provides a ratio of the number of people having the legitimate name to the statistical expectation for the identification of the error name when a common name should have been identified. This ratio, along with indications of whether an error name was generated and whether the error name was legitimate, causes a name classifier to generate entries in a register of classified common names, their associated error names, and one of four associated tags: (1) accept the error name, (2) change the name to the common name and accept, (3) change the name to the common name and reject, and (4) reject the error name. Another comparator then compares a particular word read by the system with names in the classified common name register and, based upon the above tags, selection logic decides the category into which the name should be placed.

The classification of names is built up by starting with a memory file of common names, a memory file of all legitimate names, and a memory file of confusion pairs. An error name generator examines all names in the common name file and forms error names which are likely in view of the confusion pairs. For example, since the character recognition system may read a lower case "o" as an "a," an error name for Jones would be Janes. The error name generator forms these error names from the common name file and the confusion pairs and compares the error name formed with legitimate names to see if such a name exists.

If the error name is a legitimate name, a ratio calculator calculates the ratio of the number of people having the legitimate name with respect to the statistical expectation for the character reader identifying the error name when it should have identified the common name. The ratio along with indications as to whether or not an error name was generated and whether or not the error name was a legitimate name is used by classifying logic to generate a list of common names and their associated error names categorized as to (1) accept, (2) change the name to the common name and accept, (3) change the name to the common name and reject and (4) reject. This classification is then loaded into a classified common name file.

The name read by the character recognition system is then compared with names in the classified common name file and based upon the tags in that classified common name file, selection logic decides which of the four categories the name read by the character recognition system falls into. If the name read is a name to be changed, the selection logic changes the name and passes it to a corrected name register with the appropriate accept or reject tag. If the name is not a name to be changed but is a name to be accepted, the name is passed directly to the correct name register and tagged with an accept mark. If the name read is not in the classified common name file, a comparison with an uncommon name file takes place when an end of file condition exists in the common name file. If the name is found in the uncommon name file, the name is passed out and tagged with an accept. If it is not found, the name is passed out and tagged with a reject.

BACKGROUND OF THE INVENTION

This invention relates to a statistical error reduction system for use between a character recognition system and a data processing unit. More particularly, the invention relates to apparatus for statistically improving the quantity of error-free data sent from a character reader to a computer.

Normally, error correction in character readers attempts to eliminate errors. This invention makes no attempt to eliminate errors but only to reduce the error rate. In fact, the invention may purposely introduce errors so as to reduce the overall error rate in the total data processing system. This may be better understood by examining the problem of a character recognition system working with a limited vocabulary. In particular, the character recognition system is at the Social Security Administration, and the vocabulary is the master file of names kept by the Social Security Administration.

The Social Security Administration is now using a character reader to read typewritten documents sent from employers. The documents report the amount of earnings subject to the Social Security Tax. The names read by the character reader are passed to a data processing system where they are stored on magnetic tape. The magnetic tape of the read names are matched with a master tape in the data processing system to update the master file. If the name and Social Security number read by the character reader does not match the name and Social Security number in the master file, the data processing system indicates an error and rejects the name sent from the character reader. Rejected names go through an off-line correction procedure.

Off-line correction procedures (procedures outside the data processing system requiring human attention) are time consuming and expensive. The problem is how to reduce the number of erroneous names passed to the data processing system. The course of erroneous names can be either incorrect typing by the employer when he sends the record to the Social Security Administration, or it can be a reading error made by the character recognition system reading the document sent by the employer. In either event the problem is how to reduce the off-line correction or error rate in the data processing system.

The normal approach to error reduction is to add diagnostic measurements and logic into the character recognition system in an attempt to improve the accuracy of the character reader. This approach is expensive and has certain physical limitations such as size of hardware required, cost of that hardware and time required to make all of the necessary tests to eliminate all the errors.

The approach in this invention is not to eliminate the errors nor to attempt to correct errors directly by additional recognition logic in the character reader but instead to add a separate data processing system which will reduce the error rate by making a statistical judgment.

Thus it is an object of this invention to reduce the error rate in a data processing system by making a statistical judgment based upon the frequency of usage.

It is a further object of this invention to classify the vocabulary of words used in the data processing system into classes indicating their degree of acceptability in the data processing system.

It is a further object of this invention to compare words from a character reader with words in a classified file to determine the acceptability statistically of the word read by the character reader.

It is a further object of this invention to compare the word from a character reader with a classified common word file to determine first the acceptability of the word read from the classified common word file and if the word read is unacceptable to compare the word read with an uncommon word file to see if the word is acceptable at all.

PRINCIPLE OF THE INVENTION

The above objects of the invention are accomplished through classification of words by forming expected erroneous variations on words in a word file and then determining the ratio of the usage frequency of the word in the word file to the frequency that the word will occur erroneously for another word in the word file. If this ratio is lower than a predetermined value, each time the word is read whether erroneously or truly it will be changed to the more statistically common word. If the ratio is above another predetermined threshold, then the read word is considered to be the more common statistically and is classified as accepted. If the ratio is between the previous two thresholds, the word will be marked reject whether it is truly read or the result of an erroneous reading. In addition, in this latter category if the value is reasonably close to the threshold of change-to-the-common-word, the change will be made but the statistically more common word will be marked reject.

As another feature of the invention, the above classification is used with a comparator which compares the words read by a character reader with the classified words. The word from the character reader is then classified as to its acceptability depending upon how its corresponding word is categorized or classified.

As an additional feature of the invention, only the more common words are classified. By this expedient the size of the classified file can be kept within reasonable limits yet the percentage of words in this common classified file may range as high as 75 or 80 percent of the total words which the character reader will be operating with. Words read from the character reader can then be compared with words from the common classified file to determine their degree of acceptability. If the word is unacceptable, it is a reject, and it can be compared at a second level with all of the words from an uncommon word file to see if the word should be marked as valid or reject.

The great advantage of this invention can be seen by a brief example. Assume that the common name, Jones, is erroneously read as Jonss because the character reader substitutes an "s" for an "e." The statistical number of times this will occur can be calculated by multiplying the number of Jones' by the confusion probability that "e" will be changed to "s." Assuming there are 100,000 Jones' and that the confusion probability of an "e" for an "s" is .001, this means that Jonss will be erroneously indicated by the character reader 100 times. Now if in fact there are two Jonss in the Social Security files, this means that to read the two Jonss correctly, the system will also be reading 100 Jones incorrectly. Thus the statistically superior procedure is to always change Jonss to Jones. In this way 100 errors are eliminated and only two errors are created thus the error rate is reduced by a ratio of 50 to 1. The great cost savings in off-line processing of only two erroneous names as opposed to 100 is obvious. In addition, the implementation of the invention is very simple compared with the very complex recognition and measurement techniques which would have to be added to the character reader to attempt to make it more accurate. Also, even if the character reader were improved with expensive hardware changes, this would not eliminate errors by the employer in typing the name incorrectly when sending it to the Social Security Administration. The above features, objects and advantages of the invention will be better understood by examining the detailed description of a preferred embodiment of the invention which follows.

BRIEF DESCRIPTION OF DRAWINGS

FIGS. 2*a* and 2*b* are connected together as shown in FIG. 2.

GENERAL DESCRIPTION

Figure 1:
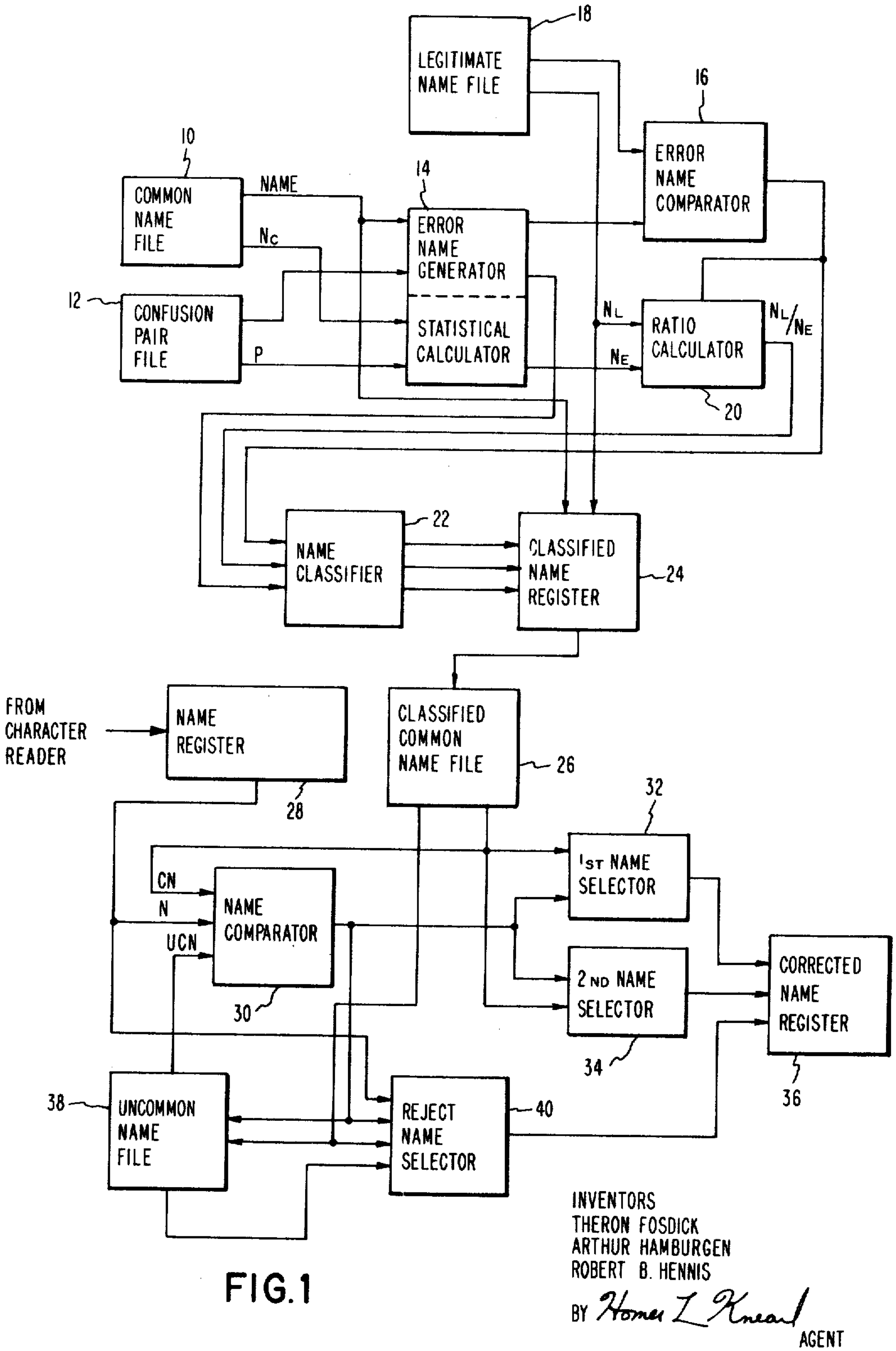
FIG. 1 is a block diagram of the preferred embodiment of the invention.

Now referring to FIG. 1, common names and their erroneous variations are classified in the apparatus shown in the upper one-half of the figure. The common name file 10 contains seventeen thousand of the most common names in the United States. These common names include about 80 percent of the population. With each common name in the file, the number of persons having that name is also stored in the file. The confusion pairs file 12 contains the substitutions likely to be made by the character reader and the probability that the substitution will occur. For example, a lower case "a" for a lower case "s" might be one substitution the character reader would erroneously make because of poor print quality and the probability of this occurring might be .002. Accordingly, one storage position in the confusion pair file would contain a for s with the probability .002.

The error name generator 14 is responsive to the common name file 10 and the confusion pairs file 12 to generate the erroneous variations on the common names. The error name generator examines a common name from the file 10 and looks for characters in the common name which have confusion pairs in the confusion pairs file 12. The error name generator 14 then makes the substitution that the character reader might make and comes up with an erroneous name which is a variation on the common name. Simultaneously, a statistical calculation is made in the error name generator which calculates the number of erroneous names the character reader will make because of substitutions. This calculation is based on the quantity of persons that have the common name and the probability that the substitution made will actually take place in the character reader. For example, the common name might be Jones with the quantity of 100,000 stored in the common name file 10. The confusion or substitution pair stored in file 12 would be *s* for *e* with a probability .001. The statistical calculator would then multiply the 100,000 by .001 and arrive at the quantity 100. This means that the character reader can be expected to erroneously generate 100 Jonss' when it actually should have read Jones.

The error name formed from the common name is then passed to comparator 16 where it is compared with all legitimate names from the legitimate name file 18. The purpose of the comparison is to detect whether the error name generated actually exists as a true legitimate name. The legitimate name file also contains the quantity of persons that have each name in the name file. If the error name actually exists, the comparator 16 activates the ratio calculator 20.

The purpose of the ratio calculator is to determine the ratio between the number of persons that have the legitimate name and the number of times that legitimate name will be erroneously generated from a common name. The number of persons ($N_L$) having the legitimate name is received from the legitimate name file 18, while the number of names ($N_E$) erroneously generated from the common name is received from the statistical calculator portion of the error name generator 14. The ratio calculator then divides the number of people that actually have that name ($N_L$) by the number of error names ($N_E$).

For example, in the case of the Jonss generated from Jones the error name comparator 16 detects that the error name Jonss actually exists as a true legitimate name stored in the legitimate name file 18. The legitimate name, Jonss, is the name of say two persons in the United States. The error name comparator 16 then signals the ratio calculator 20 to calculate the ratio between $N_L$ and $N_E$. In this case $N_L$ is 2 and $N_E$ is 100 (100,000 Jones' times the probability .001 of making the substitution *s* for *e*). Thus the ratio $N_L$ to $N_E$ is .02.

The ratio is passed to a name classifier 22. The purpose of the name classifier is to categorize the common names and their error name variations according to accept, change or reject. In addition the change category where the error name is to be changed to the common name is subcategorized as change and reject or change and accept. To make the classification decisions, the name classifier receives the ratio $N_L$ to $N_E$, an indication from the error name generator 14 as to whether or not there was an error name received and an indication from the error name comparator 16 as to whether or not there was a legitimate name for the error name. The classifications can be broken down as follows:

(1) Mark the common name accept—if there is no error name or if the ratio of $N_L$ to $N_E$ is greater than or equal to 20;

(2) Change the error name to the common name and mark it accept—if the error name exists and has a corresponding legitimate name and if the ratio $N_L$ to $N_E$ is less than or equal to .05;

(3) Change the error name to the common name and mark it reject—if there is an error name and the error name corresponds to the legitimate name, and if the ratio $N_L$ to $N_E$ is between .05 and 1 or is equal to 1;

(4) Mark the common name reject if the ratio $N_L$ to $N_E$ is between 1 and 20.

The thresholds for categorizing names is determined by experience and could be set at any threshold value which would give the lowest cost in the data processing system. For example, the threshold .05 for determining whether to mark the changed name accept or reject is based upon the cost required by an operator to manually correct rejections. In other words, if the ratio of legitimate names to error names is 1 in 20 then it is less costly to change the legitimate name to the common name rather than to accept the character reader output will all error names from the common name.

For example, the ratio of actual Jonss' to erroneous Jonss' from Jones' is 1 to 50. Therefore, it is better to treat all Jonss' as Jones' since this will cause only two errors in the system whereas if the Jonss' were read as proper names there would be 100 rejects due to improperly reading Jones. On the other hand, if the ratio of true Jonss' to erroneous Jonss' from Jones' was only 1 to 20, the cost of forcing the substitution on correct Jonss' are approximately equivalent to off-line correction of Jones'.

Returning now to the name classifier 22 in FIG. 1, the classification signals from the name classifier are passed to the classified name register 24. The classified name register 24 also receives the common name from the common name file 10 and the error name from the error name generator 14. These names plus the classification information from the name classifier allows the classified name register to store the common name marked as accept or reject or the error name marked as changed to common name and reject or accept. This information is then passed to the classified common name file 26. The apparatus just described continuously operates until all of the common names of the common name file 10 have been classified. Thus, the classified common name file 26 at the end of the processing of common names will contain all of the common names plus any error name variations on the common names and these common names plus error names will be classified into the four categories. Names from the character reader may then be compared with names in the classified common name file 26 to determine whether the name received from the character reader should be marked accept or reject or whether it should be changed and marked accept or reject.

The name from the character reader is temporarily stored in the name register 28. A name comparator 30 compares the name in the name register with all of the names in the classified common name file 26. If there is a corresponding name in the classified common name file 26, the name comparator 30 passes a signal to the first name selector 32 and the second name selector 34. The first name selector 32 and second name selector 34 are also responsive to the classified common name file 26 so that they receive the indication as to whether or not the name is to be changed to a statistically more common name.

The first name selector 32 detects that the name is not to be changed and passes the name corresponding to the input name from the common name file 26 to the corrected name register 36. In addition the first name selector 32 passes to the corrected name register 36 the accept or reject tag associated with the name.

The second name selector 34 detects whether the classified name to which the input name corresponds is marked with a change status. If it is marked with a change status, the second name selector passes the second or next name stored in the classified common name file which is the name to which the input name is to be changed. In addition, this change name also contains an accept or reject tag stored in the classified common name file 26 and this tag is also passed to the corrected name register 36.

In the event that the name comparator 30 does not detect a comparison between the input name and a name in the classified common name file, a second series of comparisons with uncommon names is made. This comparison begins when the uncommon name file 38 receives a no-match indication from the name comparator 30 and an end of file indication from the classified common name file 26. The uncommon name file 38 then passes names to the name comparator 30 to detect whether the input name is one of the uncommon names. In addition, the unmatched signal and the end of file signal from classified common name file 26 trigger the reject name selector 40 to pass the input name directly to the correct name register 36. The search through the uncommon name file then proceeds and upon reaching the end of the uncommon name file, the reject name selector tags the input name with a reject if there was no match detected by the name comparator 30. If, however, there had been a match, the reject name selector would have tagged the input name with an accept and passed it to the corrected name register 36.

To review, after the names have been classified into the classified common name file, input names may be compared with those classified names. This comparison permits logic to select whether the input names should be marked accept or reject or whether the input names should be changed to another name and marked accept or reject. In addition, there is a second level comparison if the input name does not exist in the classified common name file. In the second level comparison with uncommon names the input name is merely marked accept or reject and no effort is made to change it to a more statistically common name.

The purpose of the category change-to-common-name-and-accept has already been discussed. The purpose of the category change-to-common-name-and-reject is a little more subtle. The purpose is to improve the best guess capability of the character reading system without actually having enough confidence in the best guess to tell the data processing system to accept it. This will enable an operator to process the best guess names a little more rapidly than if they were marked simply reject. The accept category of names are those that have no erroneous variations or the number of erroneous variations is so small compared to the actual quantity of true common names that the erroneous variations can be ignored. The reject category is where the input name from the character reader cannot be found either in the classified common name file or in the uncommon name file. In other words, the input name has been erroneously read and does not exist as a legitimate name.

DETAILED DESCRIPTION

Figure 2A:
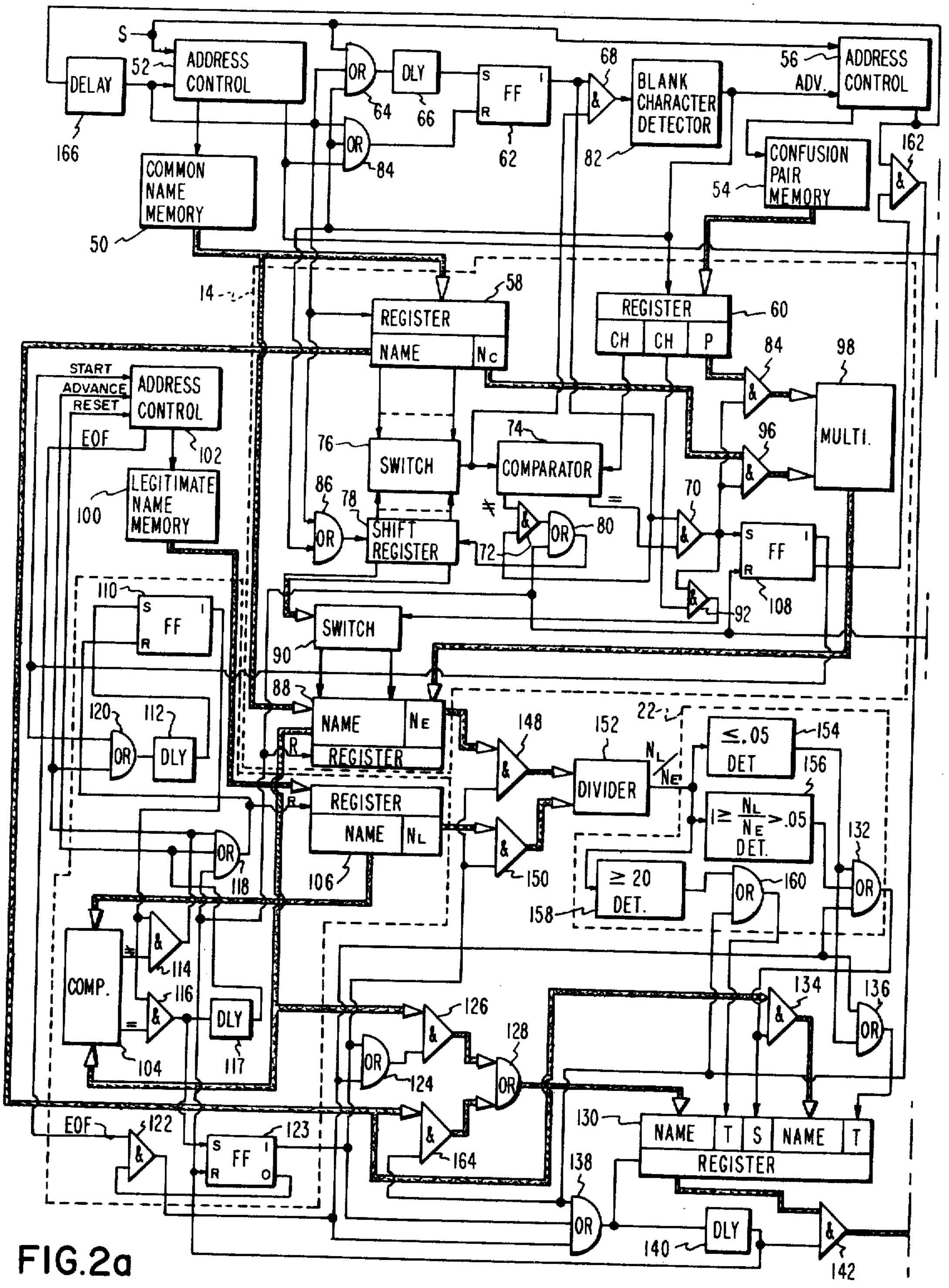
FIGS. 2*a* and 2*b* show the detail logic implementation of the system blocks shown in FIG. 1.
Figures 2, 2B:
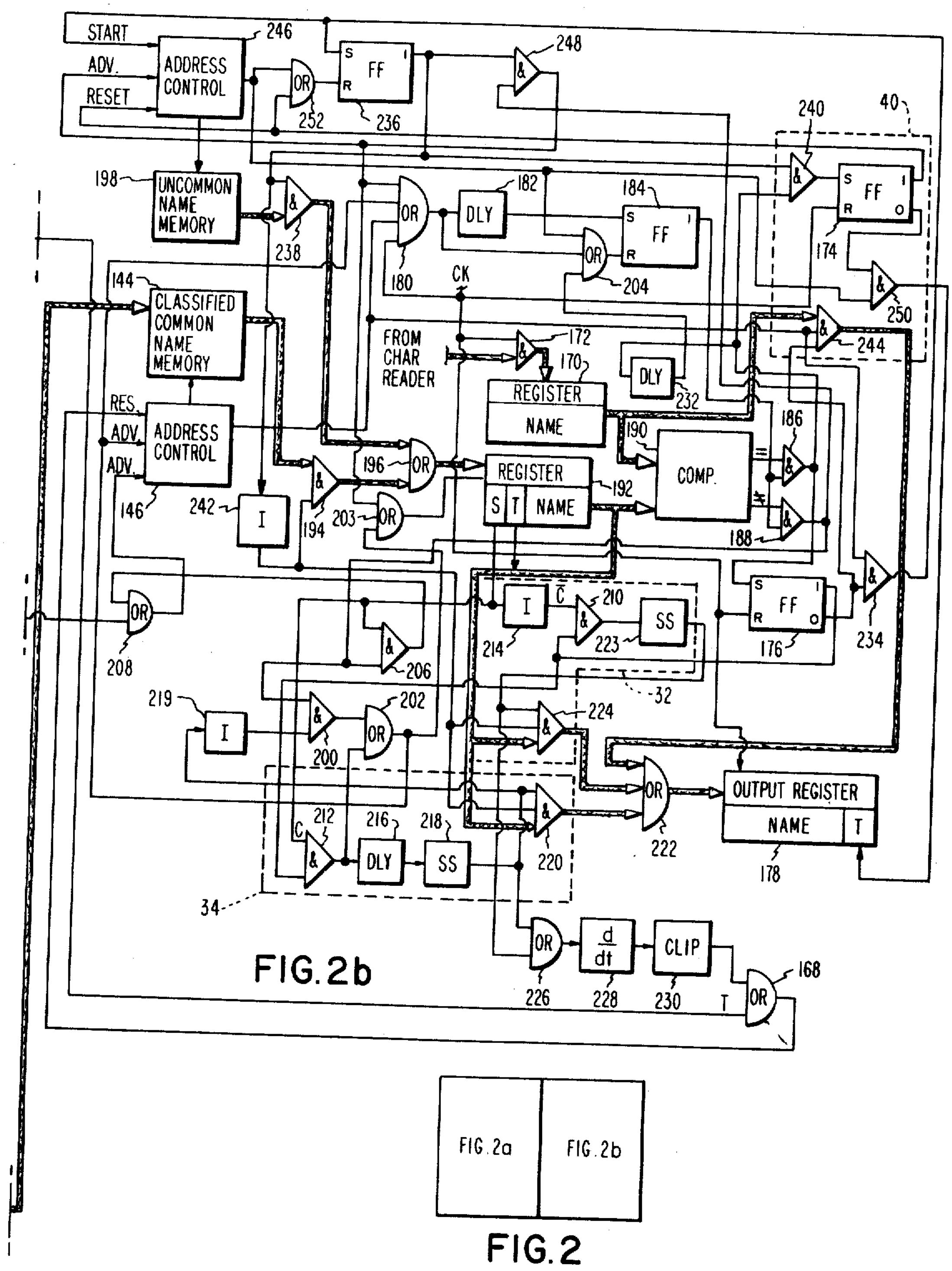

Hardware to implement the preferred embodiment in FIG. 1 is shown in FIGS. 2*a* and 2*b*. FIG. 2*a* contains the apparatus for generating the classified common name file, while FIG. 2*b* contains the apparatus for classifying input names from a character reader according to the classification in the classified common name file.

The common name file 10 of FIG. 1 consists of the common name memory 50 and the address control 52 in FIG. 2*a*. The memory 50 may be any storage device such as core storage, a disk file or a magnetic drum. The address control 52 would consist of the normal address gating circuits for the memory and a counter for advancing the address.

The confusion pairs file in FIG. 1 consists of the confusion pairs memory 54 and the address control 56 in the top right-hand corner of FIG. 2*a*. The address control 56 and the memory 52 are similar to the memory 50 and address control 52. To start the classification of common names a start signal is applied to the address control 52 and the address control 56. The address controls 52 and 56 then cause the first common name to enter register 58 and the first confusion pair to enter register 60. The quantity $N_C$ of persons having each common name is stored with each name in memory 50. Each quantity $N_C$ is also passed to the register 58 along with its associated name. The start signal which activates the address control 52 and the address control 56 is also passed to flip-flop 62 via OR gate 64 and delay line 66. The purpose of the delay 66 is to allow the registers 58 and 60 to be loaded before the flip-flop 62 is set by the start pulse. The setting of flip-flop 62 causes AND gates 68, 70 and 72 to be enabled. AND gate 70 has its other input connected to the equal or match side of comparator 74, while AND gate 72 has its other input connected to the unequal or no match side of comparator 74.

The function of comparator 74 is to compare characters from the name loaded in register 58 with a character in the register 60. In effect, the comparator 74 is looking to see if there are any characters in the name stored in register 58 which may be part of a confusion pair. The confusion pairs are cycled through the register 60 after the first character of each confusion pair is compared with each character in the name stored in register 58.

The serial comparison of the character from the confusion pair in register 60 with the characters in the name 58 operates via switch 76. The switch 76 is electronically controlled to start at the first character in the name and be advanced through the other characters in the name by a pulse shifting through shift register 78. Initially, the shift register 78 contains a set condition in its first stage. This causes the first position of the switch to pass the first character of the name from register 58 to the comparator 74. The comparator 74 compares the name's first character with the character from the confusion pair in register 60. If there is no match, a pulse passes from the comparator 74 through the AND gate 72 and through the OR gate 80 back to the shift register 78 causing the set condition in the shift register to shift one position. The second position in the shift register then causes the second position of the switch 76 to pass the second character from register 58 to comparator 74 for a comparison with the character from register 60. As long as there are no matches between characters from the name and the character in the register 60, the switch 76 will be advanced through the entire name stored in register 58. When the switch is finally positioned to a blank character (past the end of the name), this condition is detected by the blank character detector 82 which receives the character signals via AND gate 68.

The blank character detector detects the blank character and generates a pulse which is passed to the address control 56 which causes the address applied to the confusion pair memory to advance one position. In addition, the pulse from the blank character detector also resets the register 60 and resets flip-flop 62 via OR gate 84. Accordingly, with flip-flop 62 reset the AND gates 68, 70 and 72 are not enabled while a new confusion pair and associated probability is being loaded into the register 60. The pulse from the blank character detector 82 is also passed by OR gate 64 and delay 66 to cause the flip-flop 62 to again become set. The delay 66 permits the register 60 to be loaded with the new confusion pair before the flip-flop 62 is again set.

With a new confusion pair in the register 60, the comparator 74 can again look to see if a character in the name stored in register 58 corresponds to a character in the confusion pair. The shift register 78 to start the new comparison has been reset by the same pulse out of the blank character detector which advanced the addressing of the confusion pairs memory. This pulse from the blank character detector is passed via OR gate 86 to reset the shift register to a set condition only in the first stage.

In the event the comparator 74 detects a match between a name character from register 58 and the character from the register 60, an error name must be generated. To accomplish this the name stored in register 58 also passed from memory 50 to the register 88 at the bottom of the dotted lines indicating the hardware making up the error name generator 14. Register 88 only receives the name from the common name memory and does not receive the quantity $N_C$.

The register 88 also has a switch 90 which is controlled by the shift register 78 in the same manner as switch 76 is controlled. The switch 90 provides the connections from AND gate 92 to the characters in the name stored in register 88. AND gate 92 is enabled by a match condition being passed from the comparator 74 via AND gate 70 (already enabled during the comparison) to the AND gate 92. When the match condition exists, AND gate 92 is enabled to pass the character to be substituted for the name's character from register 60 into the proper location in the name in register 88 via switch 90. Switch 90 is advanced at the same time as the switch 76 so that a character match in the name in register 58 as detected by comparator 74 will cause a substituted character to be placed in the name in register 88 at the corresponding position. In this way, the name in register 88 becomes the error name if the comparator 74 detects the match between a confusion pair character and a character in the name stored in register 58.

The statistical calculator portion of the error name generator 14 (FIG. 1) consists of AND gates 94, 96 and multiplier 98 in FIG. 2*a*. When a match condition is detected by the comparator 74, AND gate 70 enables AND gates 94 and 96. AND gate 94 then passes the probability of the confusion pair to the multiplier 98, while AND gate 96 passes $N_C$—the quantity of people having the common name—to the multiplier 98. The multiplier 98 obtains the product of these two numbers and passes it to the register 88. This product is the quantity $N_E$—the number of times the error name will be generated from the common name. This completes the operation of the error name generator 14.

The error name comparator 16, shown in FIG. 1, is outlined at the left-hand side of FIG. 2*a*. The legitimate name file 18 in FIG. 1 consists of the legitimate name memory 100 and the address control 102 also shown at the left-hand side of FIG. 2*a*. The operation of the memory 100 and the address control 102 is identical to the operation in memories 50, 54 and address controls 52 and 56 although, of course, the advancing and reset signals are differently triggered.

The heart of the error name comparator 16, FIG. 1, is the comparator 104 in FIG. 2*a*. The comparator 104 receives the error name from register 88 and a legitimate name from register 106. The register 106 is loaded with the legitimate name from the legitimate name memory 100, when the address control is started and each time the address control 102 is advanced thereafter. The address control 102 is started by a signal from the set side of the flip-flop 108. Flip-flop 108 is only set if the comparator 74 in the error name generator detected a match and caused the generation of an error name. This start pulse sent to the address control 102 is also used to set flip-flop 110 via OR gate 120 and delay 112. The delay 112 permits the first legitimate name from the memory 100 to be loaded into the register 106. When the flip-flop 110 is set, AND gates 114 and 116 are enabled so that the outputs from the comparator 104 may now be monitored.

If there is no match between the legitimate name in register 106 and the error name in register 88, the comparator 104 will have an input pulse passed by AND gate 114 to OR gate 118 and also to the address control 102. This pulse resets the register 106 and advances the address and the control 102 so that a new legitimate name will be applied to register 106. The no match condition from comparator 104 is also passed via OR gate 118 to flip-flop 110 to reset the flip-flop. With flip-flop 110 reset, the AND gates 114 and 116 are no longer enabled while the new legitimate name is being fed into the register 106. The pulse out of AND gate 114 is also passed via OR gate 120 through delay line 112 to again reset flip-flop 110. The purpose of the delay is to allow the next legitimate name to be loaded into register 106 before the AND gates 114 and 116 are again enabled.

This procedure continues until the comparator 104 detects a match between an error name in register 88 and the legitimate name in register 106 or until the end of the legitimate name file in memory 100 is reached. In case of the latter event, the end of file condition from the address control 102 will be passed by AND gate 122 through an OR gate 124 to enable AND gate 126. When AND gate 126 is enabled, it passes the error name from register 88 through OR gate 128 to the first name position in register 130. In addition, the output condition from AND gate 122 is also passed via OR gate 132 to enable AND gate 134. AND gate 134 then passes the common name from which the error name originated into the second name position in register 130. In addition, the output condition from OR gate 132 also marks the status condition of the first name in register 130 as a change status. Further, the output condition from AND gate 122 is also passed by OR gate 136 to set the tag on name 2 in register 130 as accept. Thus, in the situation where an error name is generated which is not a legitimate name, that error name will be tagged as change to common name and the common name will be tagged accept.

To pass this information from register 130 to a memory, the output from AND gate 122 is also passed by OR gate 138 through delay line 140 to enable AND gate 142. AND gate 142 then passes the contents from register 130 to the classified common name memory 144 in FIG. 2*b*. The purpose of delay 140 is to allow the register 130 to be loaded with the names and their classification tags and status before the information is passed to memory 144. The output from OR gate 138 is also used to reset the register 130 just before the register is loaded with the names and classification tags.

AND gate 122 which generated the output condition indicating no match and end of file, that is, no legitimate name for the error name, is enabled by the flip-flop 123. The flip-flop 123 is normally in a reset condition. The flip-flop remains reset unless it is set by an output from the AND gate 116. AND gate 116 only has an output if there is a legitimate name for the error name as detected by comparator 104. Thus, when no legitimate name exists for the error name, flip-flop 123 remains reset and the AND gate 122 is enabled when the end of file condition is generated by the address control 102.

In the event that the comparator 104 detects a legitimate name for the error name, the AND gate 116 will have an output pulse which causes the flip-flop 123 to be set. In addition, the output pulse is delayed by delay 117 and the delay pulse is used to reset the address control to the initial address of the legitimate name memory and also to reset the register 106. The purpose of the delay 117 is to allow the classification logic to operate before the register 106 and the address control 102 are reset.

The match condition as stored in flip-flop 123 is used to enable AND gate 126 via OR gate 124. AND gate 126 then passes the error name from register 88 into the first name position of register 130. In addition, the match condition as stored in flip-flop 123 also enables AND gates 148 and 150. AND gate 148 passes the number of error names $N_E$ to divider 152, while AND gate 150 passes the number $N_L$ (number of persons who have the error name as a legitimate name) to the divider 152. The divider 152 then calculates the ratio $N_L$ to $N_E$ by dividing $N_L$ by $N_E$.

The ratio output of divider 152 is monitored by three threshold detectors. The threshold detector 154 will have an output if the ratio is less than or equal to .05. Threshold detector 156 will have an output if the ratio of $N_L$ to $N_E$ is greater than .05 and less than or equal to 1. Finally, threshold detector 158 will have an output if the ratio of $N_L$ to $N_E$ is greater than or equal to 20. The outputs from these threshold detectors are used to determine whether the first name in register 130 is to be tagged with a change status and also to determine how the accept and reject tags are to be applied to the first name in the register and the second name in the register if it is gated to the register 130.

Assuming the ratio of $N_L$ to $N_E$ was less than or equal to .05, detector 154 has an output which is passed by OR gate 132 and causes the status of the first name in register 130 to be marked change. The output from OR gate 132 also enables AND gate 134 which then passes the common name from register 58 into the second name position in register 130. In addition, the output from the detector 154 is also passed by OR gate 136 to tag the second name as accept. The overall effect of an output from detector 154 is that the error name is Name 1 in the register 130 is tagged as change and the common name is loaded in the Name 2 position and tagged as accept. Later on when names are compared against the error name, the error name will be changed to the common name and the common name will be accepted.

If the ratio of $N_L$ to $N_E$ is greater than or equal to 20, detector 158 has an output which is passed by OR gate 160 to tag the error name loaded in the first name position of register 130 as accept. In this situation the number of people that have the error name as a legitimate name is at least 20 times greater than the number of times the error name will appear as a mistake from a common name. Therefore, the error names will be marked as accepted as a legitimate name and passed to the classified common name memory as accept name. The gating to the classified common name memory 144 in FIG. 2*b* is accomplished by the set condition in flip-flop 123 acting through OR gates 138 and delay line 140 on AND gate 142 as previously described.

When the ratio of $N_L$ to $N_E$ is less than or equal to 1 and greater than .05, the detector 156 has an output which is passed by OR gate 132 to mark the error name in the name 1 position of register 130 as change. The common name is again gated via AND gate 134 into name 2 position of register 130. However, in this situation, the name 2 is not tagged accept and thus the name 2 is categorized as reject. The effect is that the error name is classified in the category change to the common name and mark the common name with a reject. As previously pointed out, this is a best guess category in which the confidence is sufficiently low that the best guess is marked with a reject tag. This completes all the situations where an error name is generated from the common names and the confusion pairs.

In the situation where no error name exists for a common name, this condition is detected by AND gate 162 in the upper right-hand corner of FIG. 2a. AND gate 162 responds to the reset side of flip-flop 108 and to the end of file signal from address control 56. The reset side of flip-flop 108 remains up if the comparator 74 in the error name generator does not detect a match between a confusion pair character and a name character. This no match condition as indicated by the reset side of flip-flop 108 enables AND gate 162. AND gate 162 passes the end of file condition when address control 56 has addressed all of the confusion pairs in the memory 54. This end of file condition from AND gate 162 is passed to the AND gate 164 at the bottom of FIG. 2a. AND gate 164 is then enabled to pass the common name from register 58 via OR gate 128 into the name 1 position of register 130. In addition, the output from AND gate 162 is passed by OR gate 160 to tag the name 1 in register 130 with an accept.

In effect, at the end of file in the confusion pairs memory the common name is passed into the register 130 and marked accept and then passed on to the classified common name memory 144. This occurs even when an error name is generated from the common name because the flip-flop 108 will be reset after that error name has been classified and passed to the classified common name memory 144 (FIG. 2b). The reset for flip-flop 108 is the signal out of delay 140 which signal also gates the contents of register 130 into the classified common name memory 144. This signal out of delay 140 is also used to reset flip-flop 110 and register 106 via OR gate 118, to reset register 88 to advance shift register 78 via OR gate 80 and to advance the address control 146 which controls the address in the classified common name memory 144. In this way the apparatus is reset each time a name has been classified in the classified name memory 144.

The end of file signal out of address control 56 is also used to advance the address control 52 so that a new common name will be loaded into register 58. The end of file signal from address control 56 is passed by delay 166 to advance the address control 52 and to reset flip-flop 62 via OR gate 84 and to reset register 58. As previously pointed out, the flip-flop 62 remains reset for a time sufficient to allow the new common name to be loaded into register 58. Then the pulse which advanced address control 52 again sets the flip-flop 62 after the delay period provided by delay 66.

Eventually all of the names in the common name memory will have been processed and categorized along with their more probable variations. The end of the processing is detected by an end of file signal out of address control 52. This end of file signal resets flip-flop 62 and flip-flop 62 remains reset until a new start signal is received. The end of file signal from control 52 also is passed to OR gate 168 in the bottom right-hand corner of FIG. 2b. OR gate 168 passes the end of file signal on to reset the address control 146 for the classified common name memory 144 back to the initial address. The classified common name memory is now loaded with all the classified common names and variations thereon and is ready to be used for classifying names read by a character reader.

Now referring to FIG. 2b, the classification of names from a character reader will be described. Names from the character reader are passed into a name register 170 in the center of FIG. 2b by an AND gate 172. The AND gate is enabled by a check signal which is on when a new name is to be gated into the register 170. The check signal also resets the entire system by resetting flip-flops 174 and 176 and the output register 178. In addition, the check signal is also passed by OR gate 180 through delay 182 to set the flip-flop 184. The set condition in flip-flop 184 then enables the AND gates 186 and 188 which monitor the outputs of comparator 190. The purpose of the delay 182 is to permit the name from the character reader to be loaded into the register 170 before the AND gates 186 and 188 are enabled.

Comparator 190 compares the name from the character reader as stored in register 170 with names from the classified common name memory 144 as each name is stored in the register 192. The names from the classified common name memory 144 are gated to the register 192 by AND gate 194 and OR gate 196. AND gate 194 is enabled when the input name from the character reader is being compared with names in the common name memory and is not enable when the input name from the character reader is being compared with names from the uncommon name memory 198.

In the event the comparator 190 detects there is no match between the input name from register 170 and the common name from register 192, comparator 190 has an output through AND gate 188. A no match indication from AND gate 188 is used to advance the address control 146 by acting through AND gate 200 and OR gate 202. The advance pulse applied to address control 146 is also applied to OR gate 180 which has an output through OR gate 204 to reset flip-flop 184 and then set flip-flop 184 a delayed time later via delay 182. The purpose of the set and reset operation on flip-flop 184 is to turn off or disenable the AND gates 186 and 188 while a new common name is being loaded into register 192. Thus the address control 146 is advanced one address position to a new name each time there is a no match indication from comparator 190 passed through AND gate 188.

In addition a mismatch indicated by comparator 190 may under certain circumstances cause the address control 146 to advance two address positions, in effect skipping a name in the common name memory. The purpose is to skip over the second name in the change-to category when the input name does not correspond to the first name of the change-to category. This is accomplished by passing the change status indication for the common name to AND gate 206. AND gate 206 then passes the mismatch signal from AND gate 188 to the address control 146 via OR gate 208. The signal from OR gate 208 also causes the address control to advance one address position. Thus, if the name in register 192 is tagged with a change status and the name is not matched to the input name, one advance pulse is passed to the address control via OR gate 202 and a second advance pulse is passed to the address control via OR gate 208. Accordingly, the address control advances two address positions and skips the second name of the change-to category.

In the event the comparator 190 detects a match between the name in register 170 and the common name in register 192, a signal is passed by AND gate 186 to set flip-flop 176. The set condition in flip-flop 176 then enables AND gates 210 and 212. If the name in register 192 which has been matched contains a change tag, this signal will cause AND gate 212 to have an output signal. However, the change signal is inverted by inverter 214 and therefore AND gate 210 does not have an output signal.

Assuming the name matched did have the change status the AND gate 212 has the output signal, this output signal is passed by OR gate 202 to advance the address control 146 to the next name, i.e., the name to which the name in register 192 is to be changed-to. The change-to name is then loaded into register 192. Meanwhile, the output signal from AND gate 212 is delayed by delay 216 and then fires a singleshot 218. The singleshot 218 enables AND gate 220. The other single line input to AND gate 220 is up since the input name from the character reader is being compared with names from the classified common name memory 144. Thus when the singleshot 218 fires the AND gate 220 is enabled and passes the change-to name from register 192 with its accept or reject tag through OR gate 222 and into the output register 178. The delay 216 is provided so that the second name in the change-to category or the change-to name will be in the register 192 when the AND gate 220 is enabled. The singleshot 218 also acts through inverter 219 to inhibit AND gate 200. This prevents advancing of the Address control 146 while the change-to name is read out of register 192.

In the event the name matched in register 192 does not have a change status tag, the AND gate 210 has an output pulse. AND gate 210 is enabled by the no change output from inverter 214 being up and the flip-flop 176 being conditioned indicating a match. The output from 210 fires a singleshot 223 which enables AND gate 224 to pass the matched name from register 192 through OR gate 222 and into the output register 178. The accept or reject tag of the name in register 192 is also carried into the output register 178. The singleshot 223 has an output pulse whose duration is sufficiently long to pass the name from register 192 into the output register 178.

The output from singleshots 218 and 223 are also connected to OR gate 226. The output from OR gate 226 is differentiated by differentiator 228 and clipped by clipper 230 so as to achieve a pulse at the trailing edge of the output pulse from either singleshot 218 or singleshot 223. This pulse at the trailing edge of the singleshot signal is passed by OR gate 168 and used to reset the address control 146 to the initial address of the classified common name memory. In this way when a new name is gated into the register 170 by a check signal, the classified common name memory 144 is aagin ready for a search through the memory.

For the same purpose the match signal is also used to reset flip-flop 184. The match signal from AND gate 186 is passed through delay 232 and OR gate 204 to reset flip-flop 184. The purpose of the relay 232 is to permit flip-flop 176 to be set before flip-flop 184 is reset. Otherwise, the reset of flip-flop 184 would turn off the setting signal via AND gate 186 applied to flip-flop 176.

This concludes the description of FIG. 2*b* when there is a match between a name from the character reader and a name in the classified common name memory. In the event there is no match of the input name to any of the names in the classified common name memory, AND gate 234 at the right-hand side of FIG. 2*b* will have an output signal. AND gate 234 is enabled by the reset side of flip-flop 176. Flip-flop 176 is reset each time a new name is gated into register 170 and remains reset unless there is a match between the input name and the name from the classified common name memory. If there is no match then when the end of file is indicated by address control 146, AND gate 234 passes the end of file signal. The signal out of AND gate 234 is used to set flip-flop 236 at the top of FIG. 2*b*. When flip-flop 236 is set, the apparatus in FIG. 2*b* changes from a mode of comparison between input name and classified common names to a mode of comparison between input name and uncommon names from the uncommon name memory 198. This is accomplished by the set side in flip-flop 236 enabling AND gates 238 and 240 and disenabling via inverter 242 the AND gates 194, 220 and 224.

The same conditions (no match and end of classified file) which caused AND gate 234 to generate a signal will also enable AND gate 244. AND gate 244 then passes the input name from register 170 to the output register 178 via OR gate 222. The only thing remaining is to determine whether this input name should be tagged accept or reject. In other words, in the circumstances where there is no match achieved with the classified common name memory, then at the end of the file of the common name memory the input name is passed into the output register 178. The only remaining task is to compare the input name with uncommon names to determine whether the input name should be tagged accept or reject.

To determine the accept or reject tag for the input name, the comparator 190 compares the input name with uncommon names as each uncommon name is placed in the register 192. The uncommon names pass into register 192 via AND gate 238 and OR gate 196 each time the address control 246 is advanced.

The address control 246 is initialized by the signal from AND gate 234 to pass the first name from the uncommon name memory to the register 192. The end of file signal from address control 146 (classified filed) meanwhile acts through OR gate 180 and 204 to reset flip-flop 184 while the uncommon name is being loaded into the register 192. The same end of file signal after being delayed again sets the flip-flop 184 which again enables the AND gates 186 and 188 which monitor the comparator 190.

When there is no match between the input name and the uncommon name in register 192, AND gate 188 has an output which is passed by AND gate 248 to advance the address one position in address control 246. This advance signal also resets the register 192 via OR gate 203 and momentarily resets flip-flop 184 through OR gates 180 and 204. As explained previously, AND gates 186 and 188 are then disenabled while the new uncommon name is being loaded into the register 192.

In the event the comparator 190 detects a match between the input name in register 170 and the uncommon name in register 192, AND gate 186 has an output signal. The output signal from AND gate 186 is passed by AND gate 240 to set flip-flop 174. AND gate 240 has been enabled by the set condition in flip-flop 236. Thus the flip-flop 174 will be set when there is a match between a name in input register 170 and a uncommon name in register 192. Normally, flip-flop 174 is in a reset condition which it acquires at the time the input name is gated into register 170. This reset condition is used to enable AND gate 250. A match condition which sets flip-flop 174 then causes AND gate 250 to be disenabled or turned off. If there is no match to set flip-flop 174, then AND gate 250 remains enabled when the address control 246 indicates the end of file has been reached in the uncommon name memory. This end of file signal from address control 246 is passed by AND gate 250 if there has been no match to set the tag in the output register 178 as reject. If there had been a match, then AND gate 250 would not be enabled when the end of filed signal was generated and the output register 178 would tag the input name received from register 170 as accept.

The end of file signal from address control 246 is also passed by OR gate 252 to reset the flip-flop 236. Resetting the flip-flop 236 changes the apparatus in FIG. 2*b* back to the mode of comparing the input name with the classified common name memory. Thus, the apparatus is ready for the next input name to be gated into the register 170.

The flip-flop 236 is also reset in the event that the comparator 190 detects a match between the input name and the uncommon name in register 192. This is accomplished by using the set side of flip-flop 174 to reset flip-flop 236. The set side of flip-flop 174 also resets the address control 246 to the initial address. The matched condition out of AND gate 186 is also passed by delay 232 through OR gate 204 to reset flip-flop 184. The delay 232 is provided so that the AND gate 186 will not be disenabled before the flip-flop 174 is set. The resetting of flip-flop 184 insures that the apparatus is ready to receive the next input name from the character reader.

To summarize the operation of the apparatus in FIG. 2*b*, an input name from the character reader is gated into the register 170. The comparator 190 then compares the input name first with the classified common names to look for a match. If there is a match, the first name selector 32, whose hardware is shown bracketed in FIG. 2*b*, then selects the name in the register 192 if there is no change tag on the name. If there is a change tag on the name, then the second name selector 34, whose hardware is also shown bracketed in FIG. 2*b*, advances the classified common name memory to gate the second name into register 192 and then pass it into the output register 178. The accept or reject tag is passed along with the names from the register 192 into the output register 178. If there is no match between the input name and a classified common name, the input name is gated into output register 178 by AND gate 244. The input name is then compared with names from the uncommon name memory 198 to determine if it is a legitimate name. If it is a legitimate name, the output register 178 will be left with a tag of accept. If it is not a legitimate name, then AND gate 250 will be conditioned to tag the input name in output register 178 with a reject tag.

It will be appreciated by one skilled in the art that there are many variations of the preferred embodiment which would enable one to practice the invention. Basically, what must be accomplished is the generation of a classified common word file into the categories of accept, change and accept, change and reject and reject. Thereafter, input words to be checked may be compared with the classified common words and categorized as accept, reject, or change and accept or reject according to how the corresponding classified common word is categorized. In addition, if the input word being checked does not exist in the classified common word file, then a check may be run against an uncommon word file to see if the input word is a legitimate word. If it is a legitimate word, it may then be marked accept. If it is not a legitimate word, then it may be tagged reject. As pointed out in the introduction, the overall effect is to statistically reduce the number of erroneous words sent to a data processing system from a character reader.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for classifying words according to their acceptability in a data processing system comprising:
- means for generating error words from a common word file, said error words being the expected erroneous variations on common words;
- means for determining the ratio of the frequency of usage of an error word as a legitimate word to the frequency that the error word is an erroneous variation from a common word;
- means for classifying the error words based upon the value of the ratio from said determining means, the words being classified according to their acceptability in the data processing system.

2. Apparatus for classifying an input word comprising the apparatus of claim 1 and in addition:
- first means for comparing the input word with classified words from said classifying means;
- means for tagging the input word to indicate its acceptability, the acceptability being determined by the classification of the classified word that the input word matches as determined by said comprising means.

3. Apparatus for classifying an input word comprising the apparatus of claim 2 and in addition:
- means for detecting when the input word does not match any classified word;
- second means actuated by said detecting means for comparing the input word with unclassified legitimate words;
- means responsive to said second comparing means for tagging the character reader word as unacceptable when it is not a legitimate word.

4. Apparatus for classifying words in a data processing system for the purpose of reducing off line correction of words comprising:
- a file of common words;
- means for generating error words from common words;
- a file of legitimate words;
- means for comparing an error word with the legitimate words;
- means, responsive to said comparing means if the error word is a legitimate word, for calculating a usage ratio between the frequency of occurrence of the legitimate word and the frequency that the same word is an error word of a common word;
- means for tagging the common words as accept and their legitimate error words as change-to common word and accept or change-to common word and reject according to the usage ratio;
- means for storing tagged common words and their legitimate error words in a classified common word file.

5. Apparaus of claim 4 for classifying words in a data processing system wherein said calculating means comprises:
- means for multiplying the frequency of occurrence of a common word by the probability of a character substitution thereby producing an error frequency product for an error word;
- means for dividing the frequency of occurrence of the legitimate word by the error frequency product of the error word identical to the legitimate word and thereby producing the usage ratio.

6. The apparatus of claim 5 wherein said tagging means comprises:
- first means for tagging the common words as accept;
- means for detecting when the usage ratio is in a predetermined range of values indicating the cost of off-line correction would be reduced by changing a word to a common word;
- second means for tagging an error word as change-to common word when said detecting means detects a usage ratio in the predetermined range.

7. The apparatus of claim 4 and in addition:
- first means for comparing input words with words from the classified common word file;
- means for accepting the input word in the data processing system if the input word matches a common word classified as "accept";
- means for changing the input word to a common word and accepting the common word in the data processing system if the input word matches a legitimate error word classified as charge-to common word and accept;
- means for changing the input word to a common word and tagging the common word as a reject if the input word matches a legitimate error word classified as change-to common word and reject.

8. The apparatus of claim 7 and in addition:
- a file of uncommon words;
- second means for comparing the input word with uncommon words if said first comparing means indicates the input word is not a classified common word or legitimate error word;
- means for tagging the input word either as an accept if the input word matches an uncommon word or as a reject if the input word does not match an uncommon word.

References Cited

UNITED STATES PATENTS 3,273,130 9/1966 Baskin et al. ________ 340—172.5

OTHER REFERENCES

Association for Computing Machinery, Proceedings of the 19th National Conference, Philadelphia, Pa., Aug. 25–27, 1964, pp. D2.4–1–D2.4–13.

RAULFE B. ZACHE, Primary Examiner

PO-1050
(5/69)

UNITED STATES PATENT OFFICE
CERTIFICATE OF CORRECTION

Patent No. 3,492,653 Dated January 27, 1970

Inventor(s) T. Fosdick et al

It is certified that error appears in the above-identified patent and that said Letters Patent are hereby corrected as shown below:

In the Claims, Column 15, line 63, "comprising" should be --comparing--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents